United States Patent
Venkitapathi et al.

(10) Patent No.: US 9,655,208 B1
(45) Date of Patent: May 16, 2017

(54) METHOD AND SYSTEM FOR OPTIMIZING OPERATIONS OF EXTERIOR LIGHTS

(71) Applicant: Wipro Limited, Bangalore (IN)

(72) Inventors: Prabhu Raja Subbarayalu Venkitapathi, Coimbatore (IN); Jasmine Singh, New Delhi (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/070,783

(22) Filed: Mar. 15, 2016

(30) Foreign Application Priority Data

Mar. 1, 2016 (IN) .............................. 201641007235

(51) Int. Cl.
*G01W 1/00* (2006.01)
*H05B 37/02* (2006.01)

(52) U.S. Cl.
CPC ..... *H05B 37/0227* (2013.01); *H05B 37/0218* (2013.01); *H05B 37/0254* (2013.01); *H05B 37/0272* (2013.01)

(58) Field of Classification Search
CPC ...... G01V 1/3808; G01V 1/001; G01V 1/286; E21B 49/006; G01H 3/14; G01W 1/16; G01W 1/10; G01R 29/0842; G01S 3/14; G06F 3/0481

USPC ..................................................... 702/1, 3–4
See application file for complete search history.

(56) References Cited

U.S. PATENT DOCUMENTS

| | | | |
|---|---|---|---|
| 6,121,875 A | 9/2000 | Hamm et al. | |
| RE38,036 E | 3/2003 | Neumann | |
| 7,386,424 B2 | 6/2008 | DeBoer et al. | |
| 2011/0119042 A1* | 5/2011 | Johnson | G06Q 10/06 703/6 |
| 2012/0206050 A1* | 8/2012 | Spero | B60Q 1/04 315/152 |

\* cited by examiner

*Primary Examiner* — Minh D A
(74) *Attorney, Agent, or Firm* — Finnegan, Henderson, Farabow, Garrett & Dunner, LLP

(57) ABSTRACT

The present disclosure relates to a method and system for optimizing operations of the exterior lights for a site of a plurality of distributed sites. The operations of the exterior lights are optimized by the lighting control system, which receive data associated with lights from at least one site of the plurality of distributed sites, wherein the data is one of exterior light data or combination of exterior and interior light data. Further, the data received from at least one site is processed in a pre-defined format to identify the current logic and the optimum logic of operation of the exterior lights. The method further identifies one or more deviations and the causes of the deviations in the operation of exterior lights to optimize the operation of the exterior lights.

28 Claims, 9 Drawing Sheets

METHOD AND SYSTEM FOR OPTIMIZING OPERATIONS OF EXTERIOR LIGHTS

FIELD OF THE INVENTION

The present subject matter is related in general to control of lighting system, more particularly, but not exclusively to a method and system for optimizing the operations of exterior lights for a site of a plurality of distributed sites.

BACKGROUND

In the present day, business must adapt to new technologies in order to accommodate changing market conditions and customer needs. In order to stay in the developing competitive environment, the organisation has to monitor the environment for better opportunities. This includes searching for viable ways for minimizing the operating expenses in the business need. One of the dominant operating needs for the industries is energy consumption. With an increase in diversity of types of controls and technologies and expansion of scale across geographies, management of the exterior lights operation has become a difficult and a costlier task. Exterior lights refer to any lights present outside the covered area of building, such as lighting for roadway, parking facilities, parks etc. With the advancement in technology, systems have been introduced for the remote management of the exterior light system.

The existing approach in the lighting system caters to the fact that, the exterior lights for a site may operate differently in different service windows, for each transition and for each of the circuit/sub-circuit of the lighting system. This causes difficulty in managing and optimizing the exterior lights operations as the scale of operation of the exterior lights increases across a distributed site.

The problem increases when along with environmental factors like cloudiness and visibility etc., additional external factors also start impacting operations of the exterior lights. For example, any manual interventions like overrides, temporary changes in the schedule, mode of operations etc. Thus in the existing scenario, managing the exterior lights for a distributed site becomes difficult since there are multiple possibilities and impacting factors which would determine if the exterior lights are operating efficiently or not.

SUMMARY

Disclosed herein is a method and system for optimizing operations of exterior lights for a site of a plurality of distributed sites. Exterior lights operations are optimized by a lighting control system. The lighting control system is connected to a plurality of distributed sites across different locations of an organization. The lighting control system optimizes the operation of the exterior lights by monitoring one or more deviations occurring in the operation of the exterior lights of a site remotely.

In an embodiment, the present disclosure relates to a method for optimizing the operation of exterior lights for a site of a plurality of distributed sites. The method comprises receiving data associated with lights from at least one site of the plurality of distributed sites. The data received is one of exterior light data and combination of exterior and interior light data, said combination of external and internal light data is processed to identify the exterior light data. The method comprises processing the data received from the at least one site of the plurality of distributed sites to obtain data in a predefined format, identifying the current logic and an optimum logic of operation of the exterior lights based on the data in the predefined format, identifying one or more deviations in the operation of exterior lights based on the current logic and the optimum logic, determining one or more causes for the one or more deviations and optimizing, monitoring and continuously improving operations of the exterior lights based on the one or more causes of the one or more deviations.

In an embodiment, the present disclosure relates to a lighting control system for optimizing operations of exterior lights for a site of a plurality of distributed sites. The lighting control system comprises a processor and a memory communicatively coupled to the processor, wherein the memory stores processor executable instructions, which, on execution, causes the lighting control system to receive data associated with lights from at least one site of the plurality of distributed sites. The data received is one of exterior light data and combination of exterior and interior light data, said combination of external and internal light data is processed to identify the exterior light data. The lighting control system processes the data received from the at least one site of the plurality of distributed sites to obtain data in a predefined format, identifies the current logic and an optimum logic of operation of the exterior lights based on the data in the predefined format, identifies one or more deviations in the operation of exterior lights based on the current logic and the optimum logic, determines one or more causes for the one or more deviations and optimizes, monitors and continuously improves the operation of the exterior lights based on the one or more causes of the one or more deviations.

In an embodiment, the present disclosure relates to a non-transitory computer readable medium including instructions stored thereon that when processed by at least one processor cause a lighting control system to receive data associated with lights from at least one site of the plurality of distributed sites, wherein the data is one of exterior light data and combination of exterior and interior light data, said combination of external and internal light data is processed to identify the exterior light data, process the data received from the at least one site of the plurality of distributed sites to obtain data in a predefined format, identify the current logic and an optimum logic of operation of the exterior lights based on the data in the predefined format, identify one or more deviations in the operation of exterior lights based on the current logic and the optimum logic, determine one or more causes for the one or more deviations and optimize operation of the exterior lights based on the one or more causes of the one or more deviations.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
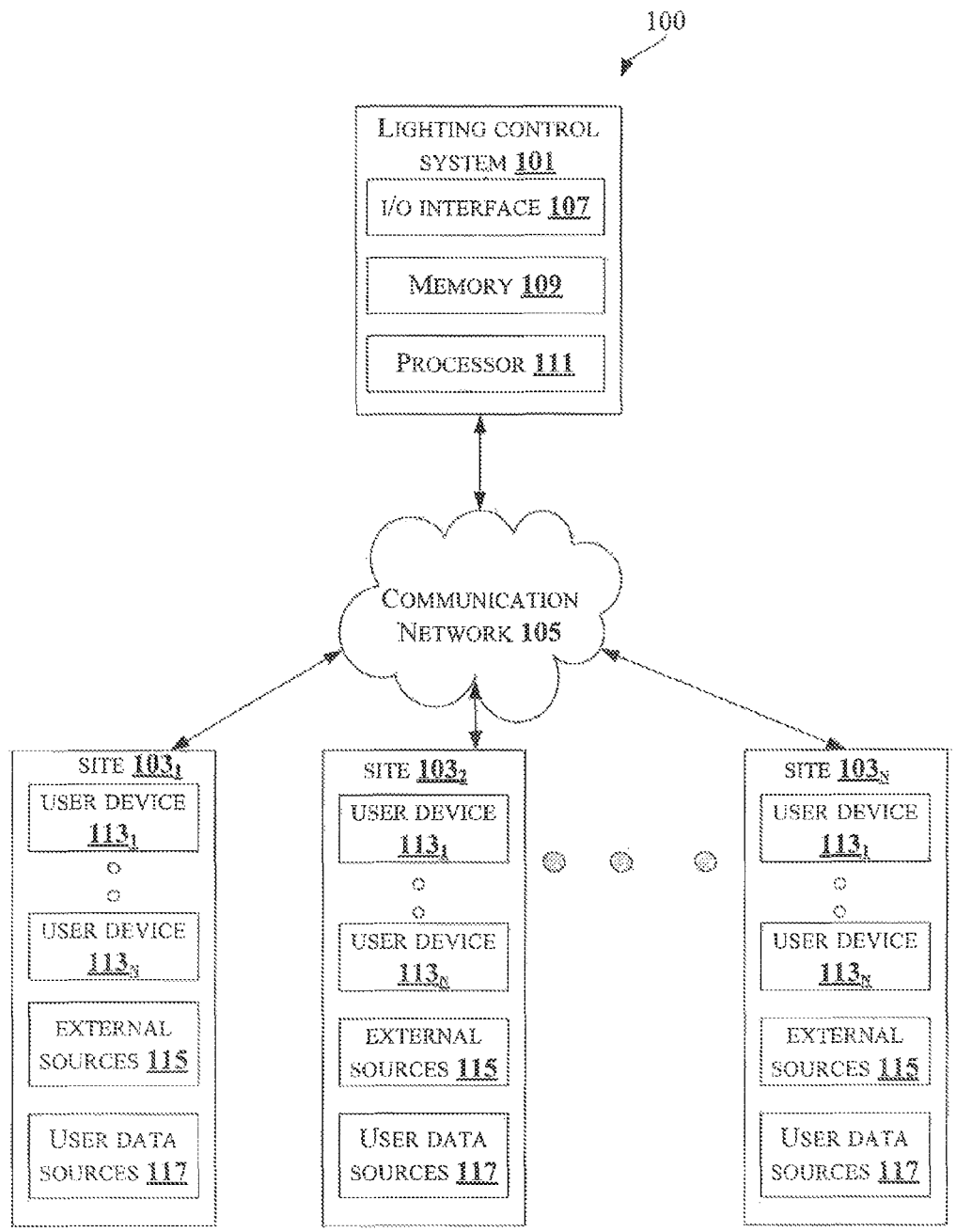
FIG. 1 shows an exemplary environment for optimizing operations of exterior lights for a site of a plurality of distributed sites in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to understand the present disclosure. It is to be understood that other embodiments may be utilized and that changes may be made without departing from the scope of the present disclosure. The following description is, therefore, not to be taken in a limiting sense.

The present disclosure relates to a method for optimizing operations of exterior lights for a site of a plurality of distributed sites. The present disclosure provides a lighting control system which optimizes the operation of exterior lights by identifying one or more deviations and one or more causes for those deviations in the operation of the exterior lights and further implements one or more resolutions to overcome the one or more deviations. The one or more deviations in the operating logic are identified based on the differences in the current and the optimum logic and deviation in implementation of the current logic. The current logic is the logic on which the exterior lights are operating currently. The optimum logic is an ideal logic for operating the exterior lights of the site. The optimum logic for the site is identified based on the efficiency of operation of exterior lights of the plurality of distributed site, statutory policy compliances to be followed while operating the exterior light and based on site operations and discrepancies. In one embodiment of the present disclosure, the optimization is done for one or more sites of a plurality of distributed sites depending on the occurrence of the deviations in the one or more sites. When the optimization is done for the one or more sites of the plurality of distributed sites, the lighting control system analyses the impacts of the one or more deviations of the plurality of distributed sites. Based on the deviations, impacts of the deviations and causes of the deviations, the lighting control system assigns priority for the one or more sites of the plurality of distributed sites. In the present disclosure, the lighting control system further generates reports and alarms based on the priority and resolves issues remotely or through the most efficient method identified, including identifying ways for temporary as well as permanent fixes. The lighting control system monitors the one or more resolutions implemented for optimizing the exterior light. In such a way, the operation of exterior lights are optimized which reduces the dependencies on the expertise of resources, increases cost effectiveness, ensures timely actions, thus enhancing the efficiency and effectiveness of operations of the exterior lights.

FIG. 1 shows an exemplary environment for optimizing the operations of exterior lights for a site of a plurality of distributed sites in accordance with some embodiments of the present disclosure.

As shown in FIG. 1, the environment 100 comprises a lighting control system 101, a site $103_1$, site $103_2$ . . . site $103_N$ (collectively referred as plurality of distributed sites 103). The lighting control system 101 is interconnected to the plurality of distributed sites 103 through a wired or wireless communication network 105. The lighting control system 101 optimizes the operation of exterior lights by identifying one or more deviations in the operation of the exterior lights. The plurality of distributed sites 103 comprises one or more user device $113_1$, user device $113_2$ ... user device $113_N$ (collectively referred as one or more user devices 113), external sources 115 and user data sources 117. The one or more user devices 113, the external sources 115 and user data sources 117 may be present within the plurality of distributed sites 103 or alternatively connected the plurality of distributed sites 103. The lighting control system 101 receives data associated with lights for at least one site of a plurality of distributed sites 103 from the one or more user devices 113, the external sources 115 and the user data sources 117. In an embodiment, the data received is either exterior lights data or combination of exterior and interior light data. In case, a combination of exterior and interior light data is received, said data is processed by the lighting control system 101 to obtain the exterior light data. FIG. 2b illustrates the different user data sources 117 connected to the lighting control system 101 and are explained in detail in following description. In an embodiment, the one or more user devices 113 are operated and/or controlled by users for management of the exterior lights of the plurality of distributed sites 103.

The lighting control system 101 comprises an I/O Interface 107, a memory 109 and a processor 111. The I/O interface 107 is configured to receive the data associated with the lights from at least one site of the plurality of distributed sites 103.

The received information from the I/O interface 107 is stored in the memory 109. The memory 109 is communicatively coupled to the processor 111 of the lighting control system 101. The memory 109 also stores processor instructions which cause the processor 111 to execute the instruction in order to optimize the operations of the exterior lights of the plurality of distributed sites 103.

Figure 2A:
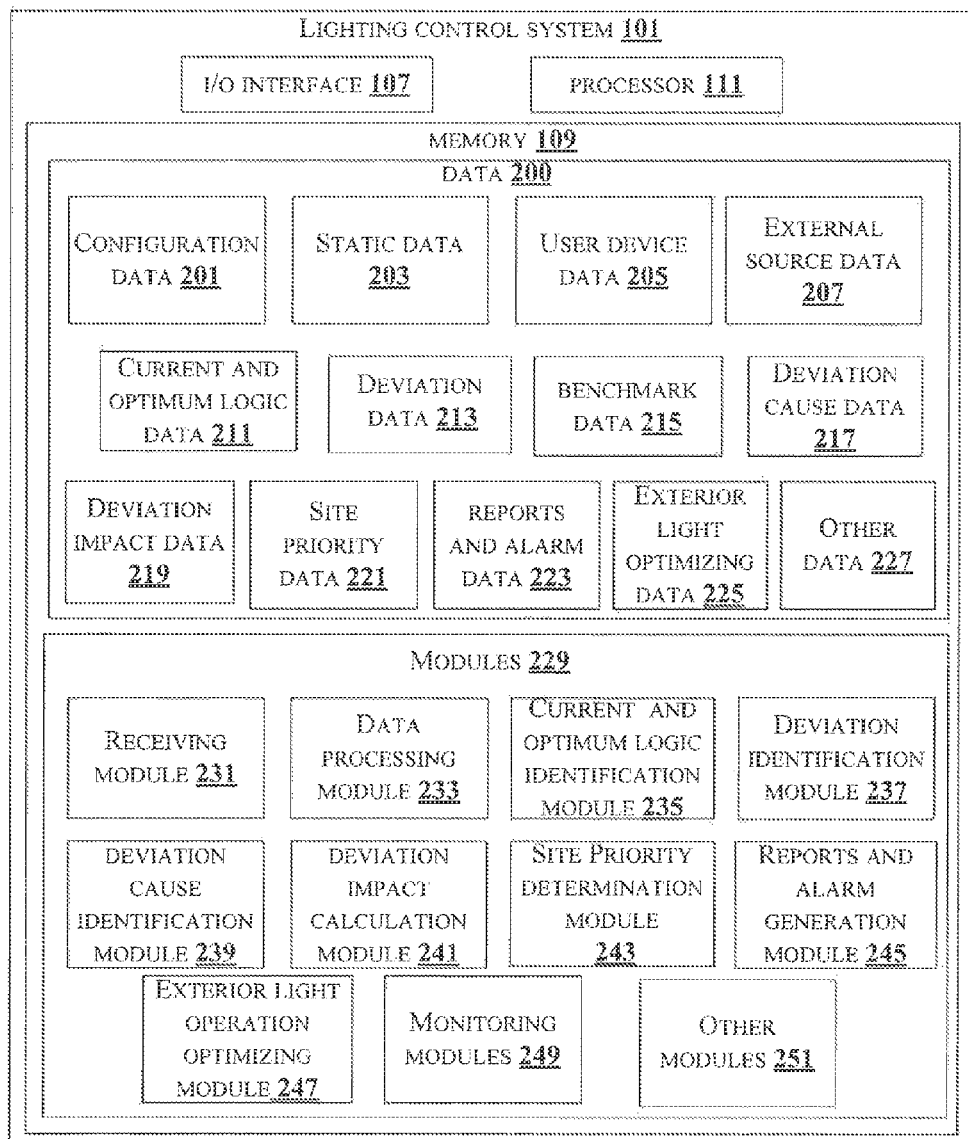
FIG. 2a shows a detailed block diagram illustrating a lighting control system in accordance with some embodiments of the present disclosure.
Figure 2B:
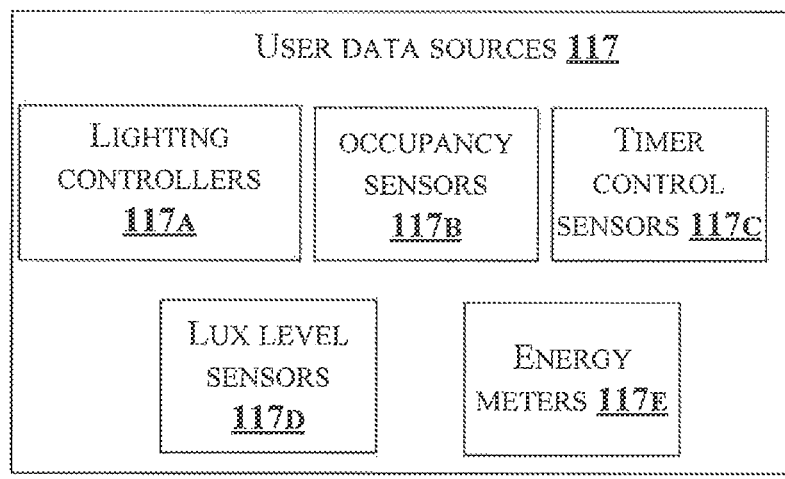
FIG. 2b shows a block diagram illustrating user data sources in accordance with some embodiments of the present disclosure.
Figure 2C:
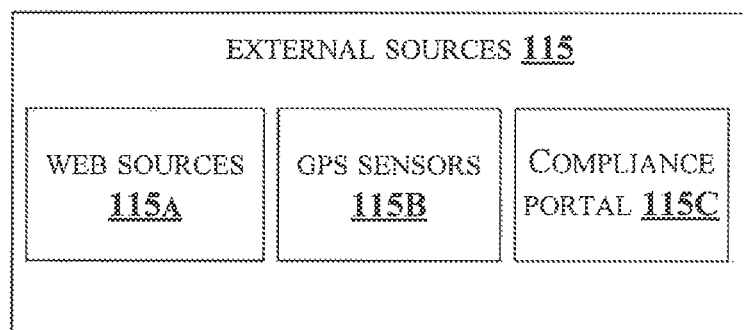
FIG. 2c shows a block diagram illustrating external sources in accordance with some embodiments of the present disclosure.

FIG. 2a shows a detailed block diagram illustrating a lighting control system in accordance with some embodiments of the present disclosure.

In the illustrated FIG. 2a, the one or more data 200 and the one or more modules 229 stored in the memory 109 are described herein in detail. In an embodiment, the data 200 includes configuration data 201, static data 203, user device data 205, external source data 207, current and optimum logic data 211, deviation data 213, benchmark data 215, deviation cause data 217, deviation impact data 219, site priority data 221, reports and alarm data 223, exterior light optimizing data 225 and other data 227 for optimizing the operation of the exterior lights.

The configuration data 201 comprises data associated with the exterior lights for a site of the plurality of distributed site 103 provided by one or more users. The configuration data 201 comprises the initial time and the end time for the analysis. This is optional and can be used if the user wants to perform analysis for a particular period of time. Further, the configuration data 201 comprises information about the number of circuits and the sub-circuits of the exterior lights which needs the optimization. The user is provided with the flexibility of choosing multiple circuits or sub-circuits for the optimization process.

The static data 203 comprises data associated with the exterior lights for a site of the plurality of distributed site 103 provided by one or more users. The static data 203 may be provided only once for each system unless any infrastructural or policy changes are made. The static data 203 comprises information about the location of the plurality of distributed site 103. This information is included per site for comparison of the plurality of distributed site 103 within the same location. In an embodiment, information about the current logic based on which the exterior lights of the plurality of distributed sites 103 operate is defined in the static data 203. The current logic can be based on any one or more or a combination of sensor based, occupancy based and schedule based. In an embodiment, the information about the current logic is either provided by the user or determined by the lighting control system 101. In an embodiment, the static data 203 also comprises details about the set-points, service windows, statutory information, cost and tariff information and the one or more buffer limits used in the analysis. In an embodiment, the information about the data quality parameters for validating the data is provided by the user. The service window data comprises information about the service windows in which the exterior lights are operated. The statutory information comprises details about the policy of operating the exterior lights in a particular location and the enterprise and the cost and tariff data comprises the cost of electricity for a distributed site which further varies depending on the location, utility and plan. Further, the user provides two set points which indicate a transition in the lighting status of the exterior lights of the plurality of distributed sites 103. For example, the lux level sensors 117D reaches the first set point in the morning, when transition from night to day occurs. At this transition, the lux-level value of the lux level sensors 117D increases. Further, the lux-level sensors 117D reaches the second set point during the evening when day to night transition occurs. At this transition the lux-level value of the lux level sensors 117D starts decreasing. The user device data 205 comprises information about the exterior lights for a site of a plurality of distributed sites 103. In an embodiment, the user device data 205 comprises a combination of interior and exterior light data. In an embodiment, the data received for the exterior lights may also be for the plurality of distributed sites 103. The user device data 205 is received from the user data sources 117. FIG. 2b shows a block diagram illustrating user data sources in accordance with some embodiments of the present disclosure. The user data sources 117 comprise in-site instrumentations such as lighting controllers 117A, occupancy sensors 117B, timer control sensors 117C, lux-level sensors 117D and energy meters 117 E. The lighting controller 117A can record status of operation of exterior lights, operating schedule and overrides for each circuit, sub-circuit and site. For example, the ON/OFF status about the lighting circuits and the sub circuits at each interval of time. The lighting status data is Boolean in nature, where '1' denotes an ON condition and '0' denotes OFF. In an embodiment, a user may provide ON/OFF time for the exterior lights, operating schedules and overrides. The override is a facility given to the one or more users for extending the operation of the exterior lights beyond the scheduled or the current logic defined. The occupancy sensors 117B detect the occupancy of any space by an occupant/manager/employee within a certain defined area. This data helps in overriding the lux sensors data. For example, if the lux level set-point for a switch-ON has been reached and if there are no occupants present then the lights would not get switched ON and vice versa. In an embodiment, a user can provide start and end time for the occupancy of occupants. In an embodiment, the occupancy of the occupant is sensed by the occupancy sensors 117B through one or more data sources for example, swipe cards, biometric devices, GPS Based etc. The occupancy of the occupant may also be determined by user data sources 117 associated with the user, for example access cards, IR smart cards etc. Further, the timer control sensors 117C are used to turn ON/OFF the exterior lights or interior lights at specific times. The information about the ON/OFF status of the exterior light schedule at each interval of time is provided by the timer control sensors 117C. Further, the lux level sensors 117D are installed at the plurality of distributed sites 103 which checks the luminosity of the area of the site. The lux level sensors 117D sense the lux level for the area of the site at which the exterior lights operating are configured to be switched ON/OFF. Further, the information about the exterior lux level, which is the presence of sunlight, is recorded by the lux-level sensors 117D. The exterior lights are switched ON based on the values of the lux level sensors 117D. Further, the energy meters 117 E comprises information on lighting consumption data, which indicates the consumption of energy by the external lights or a combination of external and internal lights of the site.

The external source data 207 comprises information about the exterior lights for a site of a plurality of distributed sites. The external sources 115 collect the information directly and feed it to the lighting control system 101. The external source data 207 comprises information about the weather related data. The weather data comprises information on sunrise-sunset, cloudiness index, visibility of the location, etc. of the plurality of distributed sites 103. In an embodiment, external source data 207 includes information on policies and compliance gathered from the compliance portals available on the web.

The current and optimum logic data 211 comprises information about the current and the optimum logic for operating the exterior light of the site. There are multiple logics in which the exterior lights can operate. The circuits of the exterior lights can be configured on any one or more mode namely, sensor based, schedule based and occupancy based or combinations. Also, the different services windows may operate based on a different logic. In an embodiment, information about the current logic of the exterior lights is provided by the users of the plurality of distributed site 103. The optimum logic is identified based on comparative benchmarking at site, circuits, sub circuits level for efficiency of operation of the exterior lights of plurality of distributed sites 103, industry practices and statutory policy compliances and are subsequently tailored based on deviations, their causes and impacts.

The deviation data 213 comprises information about the one or more deviations in the operation of the exterior lights of a plurality of distributed site 103. The deviations indicate fluctuations in the current operating logic of the exterior lights. The one or more deviations are classified into positive and negative deviations. The positive deviations are the deviations which result in energy savings and are mostly based on the compliances issue. For example, exterior lights switched ON late. The negative deviations are the deviations which result in more consumption of the energy power. For example, exterior lights switched ON early, leading to increased run-hours.

The benchmark data 215 comprises information about the benchmark sites, benchmark circuits and benchmark sub circuits identified based on at least one of location, operating patterns, policy, asset type, configuration etc. These identified benchmarks are used to determine deviation causes and scope for further improvement.

The deviation cause data 217 comprises information about the one or more causes which lead to the deviation from the current as well as the optimum logic. The one or more deviations identified are correlated with the one or more external source data 207 and other user device data 205 to identify the one or more causes of the deviations. The one or more deviations of the exterior lights of a site are correlated with the weather related data, override data, policy data, asset data, run-hours data and consumption data. Further, the one or more causes are identified by comparing the deviations of the plurality of distributed sites 103 with benchmark sites, benchmark circuits and benchmark sub circuits of the plurality of distributed sites with similar characteristics like location, climate, policies, operating pattern, other static data 203 etc.

The deviation impact data 219 comprises information about the one or more impacts for the one or more deviations. The impact for the one or more deviation is calculated at the circuit, sub circuit or site level. The impact for the one or more deviation is defined as the number of deviation minutes per site per circuit for a given duration. Further, if the cost and tariff value is provided by the user, the monetary impact value is also calculated.

The site priority data 221 comprises information about the priority assigned for the plurality of distributed sites 103. The priority is assigned for at least one site based on the one or more causes and the one or more impacts of the deviation. The priority for a site is indicated depending on the number of deviation, type of the deviation, impact of deviation and urgency of resolutions.

The reports and alarm data 223 comprises information about the alarm for the one or more deviations which need immediate resolutions and are enabled through auto correction, batch processing, correction notification, correction effectiveness to users and for site dispatch etc. The report data includes information on alarms and data from current and optimum logic data 211, deviation data 213, benchmark data 215, deviation cause data 217, deviation impact data 219, site priority data 221 and other data 227. The report data further comprises long term actions/suggestions and plans to optimize performance further.

The exterior light optimizing data 225 comprise information about the temporary and permanent resolutions performed for optimizing the operations of exterior lights. The exterior light optimizing data 225 also comprises the optimum logic determined for the one or more deviations of the exterior light of a site of a plurality of distributed site 103.

The other data 227 may store data like default benchmark values, history data, alarm counts etc., including temporary data and temporary files, generated by modules for performing the various functions of the lighting control system 101.

In an embodiment, the one or more data 200 in the memory 109 are processed by the one or more modules 229 of the lighting control system 101. The one or more modules 229 may be stored within the memory 109 as shown in FIG. 2a. In an example, the one or more modules 229, communicatively coupled to the processor 111, may also be present outside the memory 109 and implemented as hardware. As used herein, the term module refers to an application specific integrated circuit (ASIC), an electronic circuit, a processor 111 (shared, dedicated, or group) and memory that execute one or more software or firmware programs, a combinational logic circuit, and/or other suitable components that provide the described functionality.

Figure 2D:
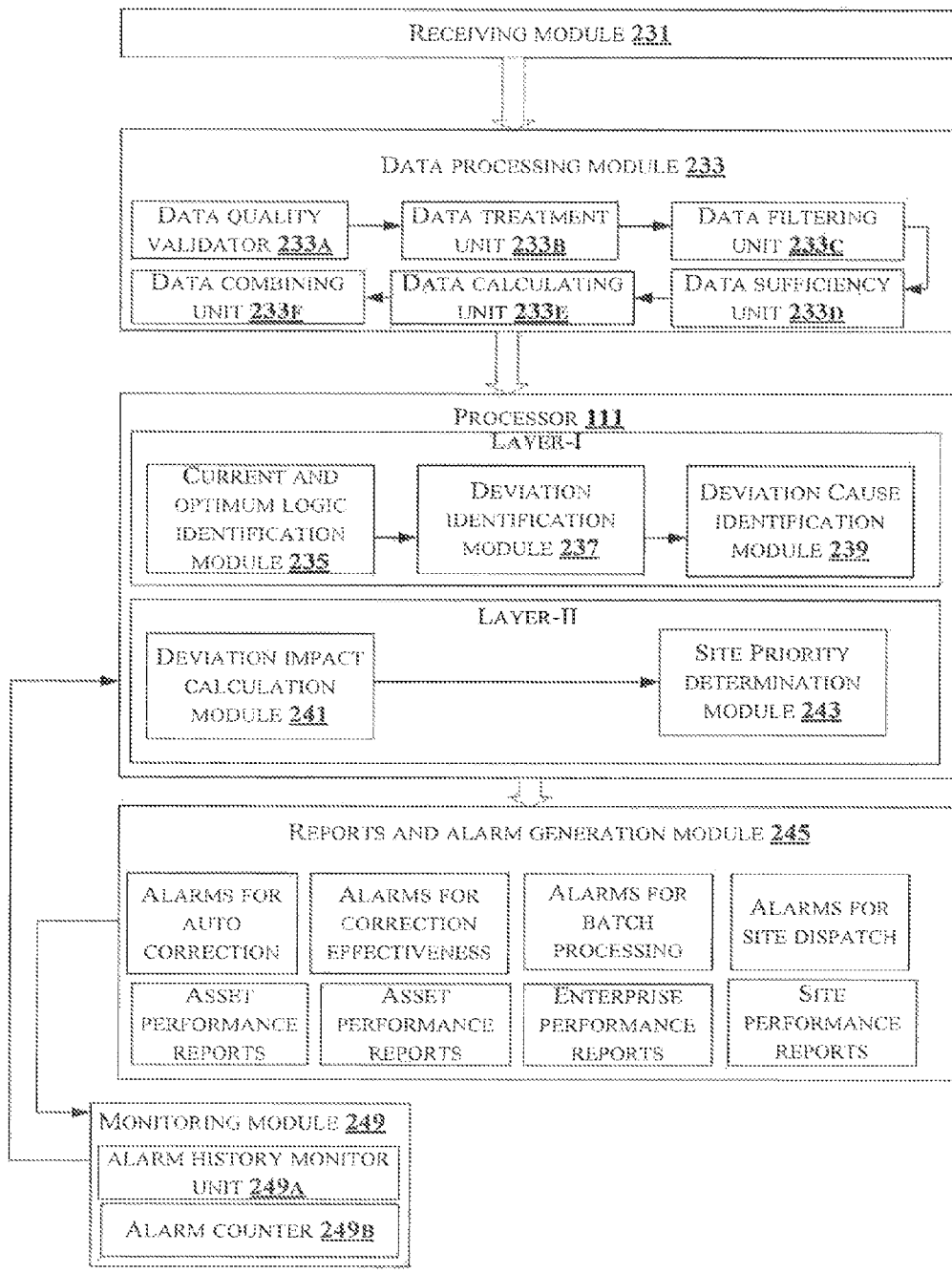
FIG. 2d shows an exemplary environment illustrating data flow between different modules of the lighting control system in accordance with some embodiment of the present disclosure.

In one implementation, the one or more modules 229 may include, for example, a receiving module 231, a data processing module 233, a current and optimum logic identification module 235, a deviation identification module 237, a deviation cause identification module 239, a deviation impact calculation module 241, a site priority determination module 243, reports and alarm generation module 245, an exterior light operation optimizing module 247 and a monitoring module 249. FIG. 2d shows an exemplary environment illustrating data flow between different modules of the lighting control system in accordance with some embodiment of the present disclosure.

The memory 109 may also comprise other modules 251 to perform various miscellaneous functionalities of the lighting control system 101. It will be appreciated that such aforementioned modules may be represented as a single module or a combination of different modules.

The receiving module 231 receives user device data 205, static data 203 and configuration data 201 from one or more user devices 113. Further, the receiving module 231 also receives information about the exterior lights of a distributed site from one or more external sources 115. The one or more user devices 113 provide information about the operation of the exterior lights of the site of a plurality of distributed sites 103.

The data processing module 233 processes the data received from the one or more user devices 113, static data 203, configuration data 201 and the exterior sources 115 for the exterior lights of a plurality of distributed sites 103. The data received by the one or more user devices 113 is either exterior light data or combination of external and internal light data. The data processing module 233 identifies the external light data if the data received is combination of internal and external light data. Further, the data processing module 233 comprises a data validator unit 233A, a data treatment unit 233B, a data filtering unit 233C, a data sufficiency unit 233D, a data calculating unit 233E and a data combining unit 233F. The data validator unit 233A of the data processing module 233 validates the identified external light data to determine any invalid data in the exterior light data, where the invalid data comprises treatable and non-treatable data. Further, the data treatment unit 233B treats the treatable data. The data filtering unit 233C filters the invalid data by retaining the treated data and removing the non-treatable invalid data. The data sufficiency unit 233D determines sufficiency of the filtered data. The data sufficiency is checked based on two criteria. Firstly, all the necessary data is present in the filtered data and secondly the duration for which the data is available is sufficient. Further, the data calculating unit 233E calculates one or more transition points for the lighting status data, occupancy data, schedule data and sensor data using the filtered data. The transition points indicate the change in the status of the data in case of lighting status data, occupancy data, schedule data, while it indicates transition of sensor values from below set-point to above set-point or vice versa. Further, the data combining unit 233F of the data processing module 233 combines the transition points calculated for the lighting status data, occupancy data, schedule data and sensor data to obtain the data in the pre-defined format, which can be further used for identifying the current and the optimum logic.

The current and optimum logic identification module 235 identifies the current as well the optimum operating logic of the exterior light of a plurality of distributed site 103. The current and optimum logic identification module 235 identifies a service window for each of the transition points based on the operations. Further, based on the transition points assigned, the current logic/mode of the exterior light operations is identified for each circuit, sub circuit, for each service window and each transitions (from ON to OFF and OFF to ON). The type of mode may be any one or combination of the sensor mode, occupancy and schedule mode. The current and optimum logic identification module 235 further determines the prominent mode in which the exterior light of a site is operating based on factors such as frequency, operating pattern, configuration changes etc. In an embodiment, if a conflict occurs in deciding the prominent mode, optimum mode is considered as the current logic. The optimum logic is identified based on comparative benchmarking at site, circuits, sub circuits level for efficiency of operation of the exterior lights of plurality of distributed sites 103, industry practices and statutory policy compliances and is subsequently tailored based on deviations, their causes and impacts.

The deviation identification module 237 identifies one or more deviations in the operating logic of the exterior lights for a site of a plurality of distributed site 103. The deviation identification module 237 estimates the one or more deviations from the prominent mode of operation and the optimum mode of deviation. The deviations are classified into two types namely, positive deviation and negative deviation.

The deviation cause identification module 239 identifies one or more causes of the one or more deviation by performing at least one of, validating the sensor data with the weather related data to analyse proper operations of sensors. Further, the deviation cause identification module 239 identifies at least one of benchmark sites, benchmark circuits and benchmark sub-circuits based on at least one of location information, weather data, operating patterns, policy, configuration and assets types to identify one or more causes of the one or more deviations. The deviation cause identification module 239 further identifies the one or more causes for the deviations by correlating the one or more deviations identified with the override data, weather data, policy, asset types, run-hours data and consumption data etc. In an embodiment, the lighting control system 101 identifies a location from the plurality of distributed sites based on the similar weather information, asset types, policy, sensor configuration etc. Further, the deviation cause identification module 239 compares at least one of the data and the one or more deviations of the site of a plurality of distributed sites 103 with the benchmark sites of the identified location. The deviation cause identification module 239 also compares the one or more deviation data 213 with one or more data of the identified benchmark sites, benchmark circuits, and benchmark sub-circuits.

The deviation impact calculation module 241 identifies one or more impacts for the one or more deviations. The deviation impact calculation module 241 calculates the impact of the deviation for each level. The deviation impact calculation module 241 calculates the impact for the one or more deviations based on the number of deviation occurring per site and for per circuit for a given duration. Further, if the cost and tariff data is available, the deviation impact calculation module 241 calculates impact in monetary value.

The site priority determination module 243 determines the priority for the plurality of distributed sites 103. The priority for the plurality of distributed sites 103 is determined based on the one or more causes and the impacts of the deviation. In an embodiment, the priority is assigned for at least one of the site of the plurality of distributed sites 103. The site priority determination module 243 assigns priority based on the type of the deviation, for example positive deviation, negative deviation etc. The positive deviations are given priority due to the compliances issues. The site priority determination module 243 keeps all the compliances issues in the first priority. In the first priority, the site priority determination module 243 prioritizes the plurality of distributed sites 103 based on the number of hours of positive deviation. The negative deviations vary between second and third priority. In the negative deviation, the priority is assigned based on the time duration of the deviation and the consumption per hour. For both positive and negative deviation, the modules enable batch process, auto correction, and intimation by generation of alarms for the plurality of distributed sites 103 undergoing deviations. Also, if the deviations are addressable remotely such as schedule change, manager-in lock out, set-point change and Outside Light Sensors (OLS) calibration remote corrections are carried out. Further, as an immediate measure for the inefficiency, corrections and temporary fixes can be done on schedules, which are carried out based on sunrise/sunset time (local time) and/or other schedules and/or occupancy/manager out time. If the optimum logic identified cannot be implemented at the moment, second best optimum logic is identified and used/suggested for resolution. Fixes related to enhanced energy efficiency like circuit synchronization are suggested through reports and alarms.

The reports and alarm generation module 245 generates one or more reports for the exterior lights operations of plurality of distributed site 103. The one or more reports generated by the reports and alarm generation module 245 comprise enterprise performance report, site performance report, asset performance report etc. The reports and alarm for the operation of exterior lights are generated based on the priority of the distributed site 103 and expertise required for the one or more deviations. The expertise requirement comprises one or more technicians required to correct any deviations for the sites manually. The reports are generated by the reports and alarm generation module 245 based on the performance of the plurality of distributed sites 103 which are optimized by the lighting control system 101. The reports for optimizing the operation of exterior lights comprise type of expertise required for any particular deviation. The reports and alarm generation module 245 also generates one or more alarms. The one or more alarms generated by the reports and alarm generation module 245 comprises auto correction alarm, alarm for correction effectiveness, batch processing alarm, site dispatch alarms, statutory policy adherence alarm etc. The alarms are generated for the one or more deviations which require immediate resolution in order to remove the one or more deviations from the exterior lights operation. Reports can be customized based on user need. In addition, all the reports generated by the reports and alarm generation module 245 are available which can be utilized by one or more output devices 613 like alarms vendor unit, customer system interfaces, customer stakeholders etc.

The exterior light operation optimizing module 247 optimizes the operation of exterior lights of a site of plurality of distributed sites 103 by implementing the one or more resolutions identified based on the one or more causes, impacts, the one or more deviations, policy requirements and other site discrepancies. For example, if one or deviations occurs in the lux level sensors 117D, the expertise required like replacement or calibration of the lux level sensors 117D are carried out. Further, if a schedule change or set point change or occupants IN/OUT status occurs, remote corrections for the schedule change are carried out. To avoid non-compliance issues, one or more resolutions based on the local time priority are carried out. In an embodiment, the exterior light operation optimizing module 247 optimizes the operation of the exterior lights by conforming to the statutory policy requirements. The statutory policy requirements are the legal statutes defined by the legal authorities to be followed by any organisation. In case due to certain site discrepancies, optimum logic cannot be implemented, second best optimum logic is used to resolve the issue as a temporary fix.

The monitoring module 249 monitors the one or more resolutions performed for optimizing the operation of exterior lights of the site of plurality of distributed sites 103. The monitoring module 249 also monitors the alarm generated for the one or more deviations which need immediate resolutions. Further, the monitoring module 249 monitors the one or more deviations, the one or more causes, the one or more impacts and the effectiveness of the one or more resolutions performed for optimizing the operations of the exterior lights. In an embodiment, the effectiveness of the one or more resolutions is determined for at least one of one or more modes of optimization and one or more entities optimizing the operation of exterior lights. The monitoring module 249 contains alarm counter unit 249B as shown in FIG. 2d. The alarm counter unit 249B keeps a count of the recent alarm generated for a specific period of time quantifies them and manages alarm trigger to avoid repeat or duplicate alarm within specific time interval. Further, the monitoring module 249 also contains an alarm history monitor unit 249A as shown in FIG. 2d which monitors the resolutions taken for the one or more deviations, effectiveness of the resolution mechanisms and also the time taken for implementing the resolutions for optimizing the operation of exterior lights. In an embodiment, the monitoring module 249 monitors the optimization of the exterior lights by conforming to the statutory policy compliances for the exterior lights of the plurality of distributed sites 103.

Figure 3:
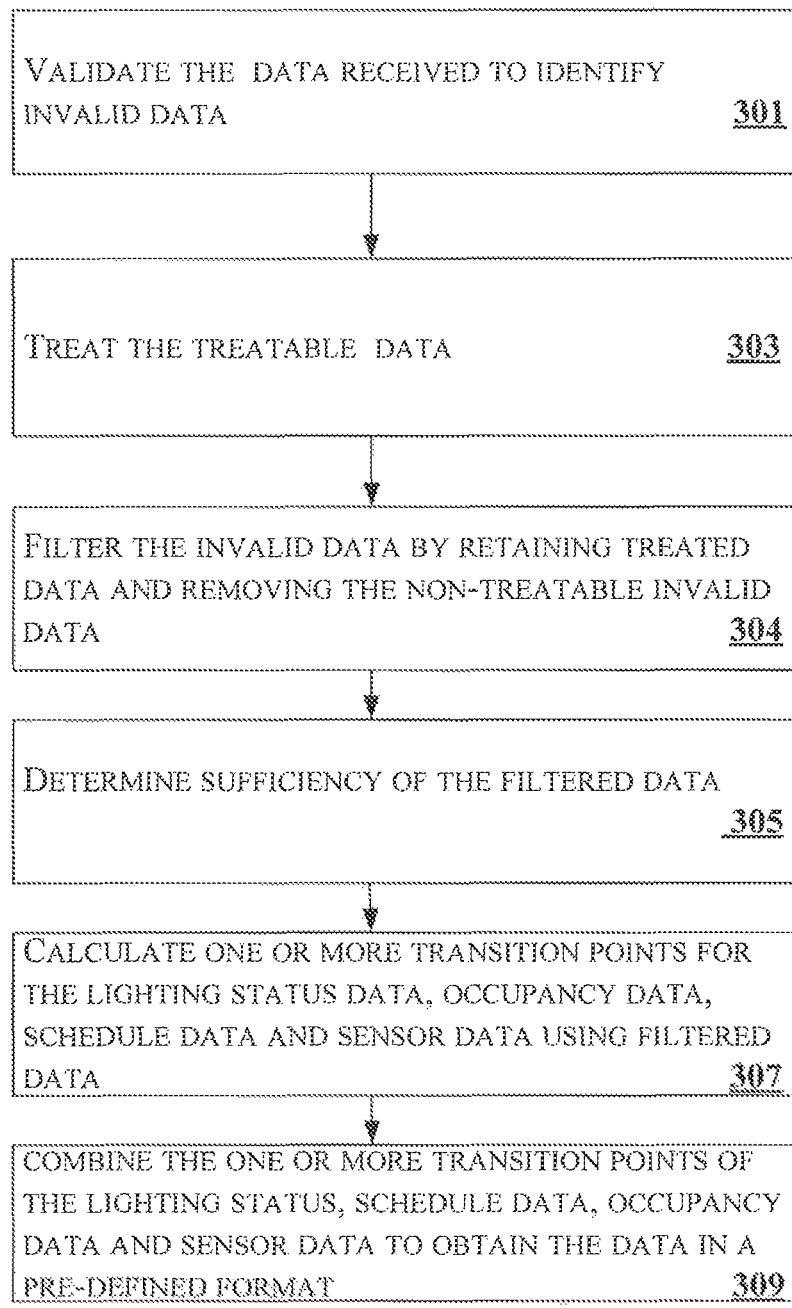
FIG. 3 illustrates a flowchart showing a method for processing the data received from lighting control system in accordance with some embodiments of present disclosure.

FIG. 3 illustrates a flowchart showing a method for processing the data received by lighting control system in accordance with some embodiments of present disclosure.

As illustrated in FIG. 3, the method 300 comprises one or more blocks for processing the data received from the lighting control system 101.

The lighting control system 101 receives data associated with lights for optimizing the operations of exterior lights. The data associated with the light is received from various external sources 115 and one or more user devices 113 or through system integration like integration with BMS. In an embodiment, a user enters a number of data samples for a particular site for optimizing the exterior light operations. The sample data is defined as a data input necessary for carrying out the optimizing operations.

At block 301, a data quality validator 233A validates the received data by identifying invalid data, where the invalid data comprises treatable and non-treatable data. The received data is validated based on three parameters namely, missing sample parameter, duplicate sample parameter and limit parameter. In the missing sample data, if the data sample is missing it can result in wrong calculation or estimation and further cannot be used for optimizing the operation of the exterior light. The duplicate sample parameter checks for the similar data since it may lead to either overestimation or underestimation. For example, if there are two timestamps with same values, one of the timestamp is removed. However, if there are two timestamps with different values the one closer to acceptable limit defined in by the user is selected. In case, both the timestamp fall in limits and are not closer in range, then both the values are deleted. Further, all the data values are accepted within a defined range. In the limit parameter, the limit for the data sample is checked. The acceptable limit is defined by the user and in case the limit is not defined, the lighting control system 101 uses default values depending on the site parameters.

At block 303, a data treatment unit 233B treats the treatable data;

At block 304, a data filtering unit 233C filters the invalid data by retaining treated data and removing the non-treatable invalid data;

At block 305, a data sufficiency unit 233D determines sufficiency of the filtered data. The data sufficiency of the data sample is checked based on two criteria. Firstly, the entire data sample should be available for optimization and secondly the duration should be sufficient for the available sample data.

At block 307, a data calculating unit 233E calculates one or more transition points for the lighting status data sample, occupancy data, schedule data and sensor data based on the filtered data. The sensor data transition through set-point is based on individual set-points received from the user for each site, circuit and sub-circuit. This ensures that any calibrations done for the sensors do not impact the calculation of transition point for sensors.

At block 309, a data combining unit 233F combines the one or more transition points of the lighting status data, the schedule data, the occupancy data and the sensor data to obtain the data in the predefined format. The pre-defined format is the data which is further used for identifying the current and the optimum logic of operation of the exterior lights.

Figure 4:
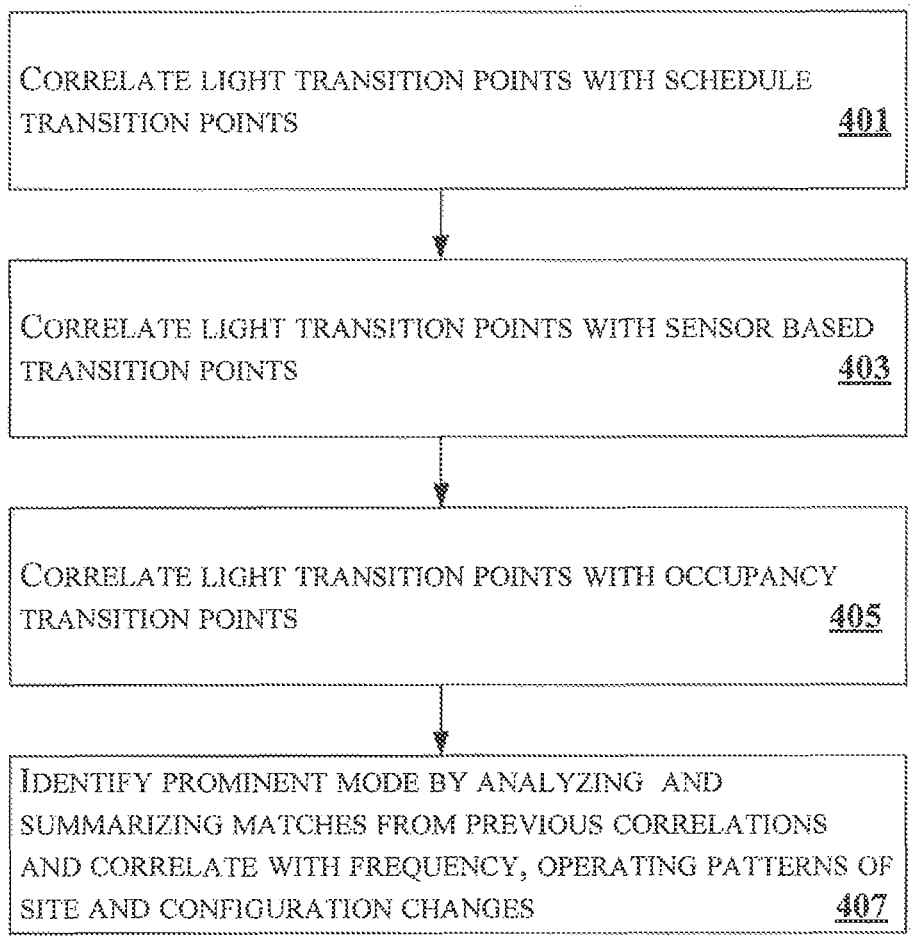
FIG. 4 illustrates a flowchart showing a method for identifying the current logic of the exterior lights for a site in accordance with some embodiment of present disclosure.

FIG. 4 illustrates a flowchart showing a method for identifying a current logic for operating the exterior lights in accordance with some embodiment of present disclosure.

As illustrated in FIG. 4, the method 400 comprises one or more blocks for identifying a current logic from the pre-defined data received from the lighting control system 101.

The current logic is identified by correlating the transition points of the lighting status data with transition points of schedule, sensors and occupancy mode and factors such as frequency, operating pattern of site, configuration changes etc. For each correlation, if the transition points of the lighting status data is equal to the time as determined by the sensors, schedule and occupancy mode, then it is considered as a match. A default buffer limit for considering a match is used, or as defined by the user.

At block 401, the lighting control system 101, correlates the transition points of lighting status data with the transition points of schedule mode. In an embodiment, if the difference between lights switch ON time of the lighting status data and schedule ON time indicates a null or the difference between the lights OFF time of the lighting status data and schedule OFF time implies null, then it is considered as a match. A default buffer limit for considering a match is used, or as defined by the user.

At block 403, the lighting control system 101, correlates the transition points of the lighting status data with the transition points of sensor mode. In an embodiment, if the difference between determination of the lux level set points and the sensors determination of set points is less than pre-defined percentages, then a preferred range of buffer value is added. For example, if the difference between lux level set points and sensor value is less than 2% then a buffer time of 15 minutes are added. Further, if the transition points of the lighting status falls in the range as determined from the differences of lux level set points and sensors value, then it is considered as a match.

At block 405, the lighting control system 101, correlates the lighting transition points with occupancy transition points. For example, if the OFF time of the exterior lights is equal to any occupants like manager out time plus some additional minutes, it is considered as a match.

At block 407, the lighting control system 101 analyse and summarizes the matches obtained from the previous step and correlates with factors such as frequency, operating pattern of the site, configuration changes to identify the prominent mode. In an embodiment, the matches are counted for the entire duration during which the plurality of distributed sites 103 operate, categorized by service windows for each ON/OFF. In an embodiment, the logic with maximum matches is considered as the prominent mode or the current logic of the exterior lights. In case there are equal matches, optimum mode is considered as the current logic. The optimum logic is identified based on comparative benchmarking at site, circuits, sub circuits level for efficiency of operation of the exterior lights of plurality of distributed sites 103, industry practices and statutory policy compliances and is subsequently tailored based on deviations, their causes and impact.

Figure 5:
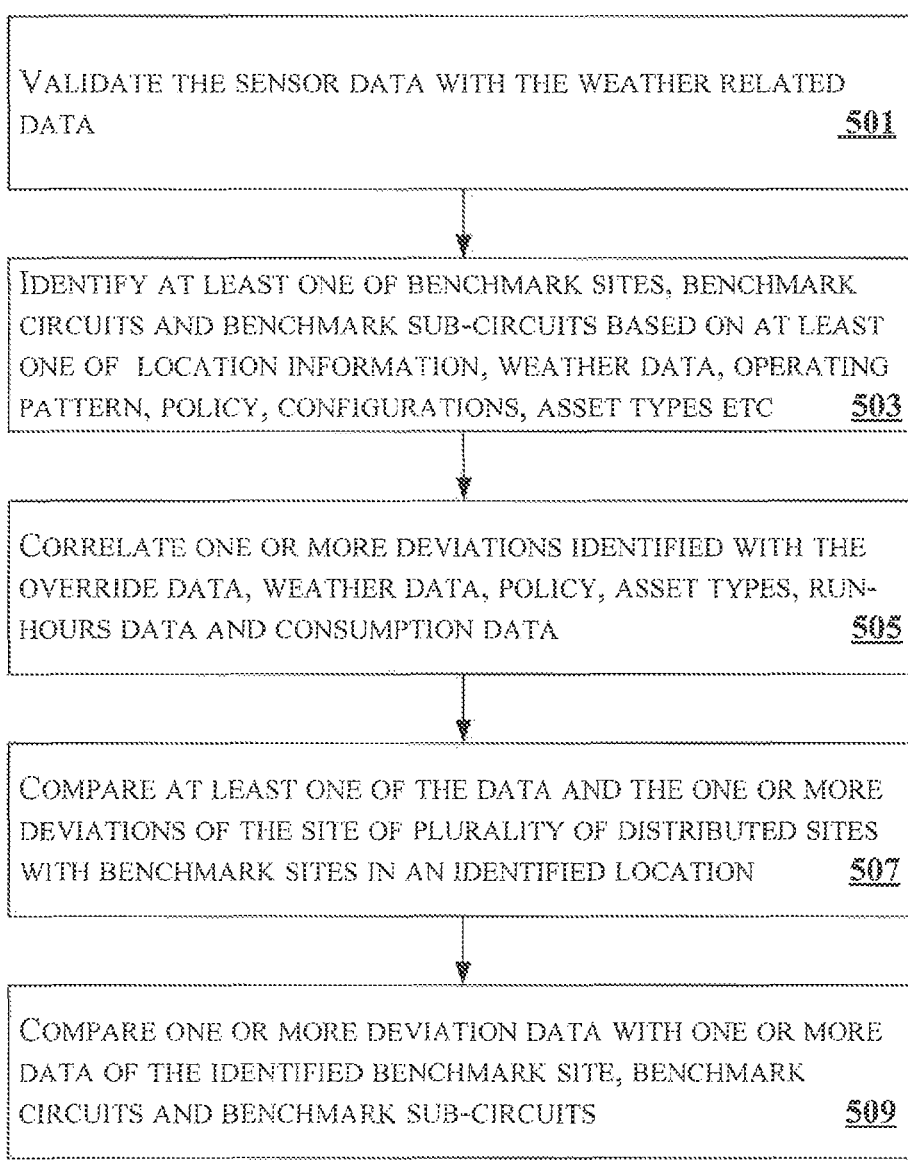
FIG. 5 illustrates a flowchart showing a method for identifying causes for the one or more deviations occurring in the operation of exterior lights in accordance with some embodiment of present disclosure.

FIG. 5 illustrates a flowchart showing a method for identifying the causes for the one or more deviations occurring in the operation of exterior lights in accordance with some embodiment of present disclosure.

As illustrated in FIG. 5, the method 500 comprises one or more blocks for identifying the causes for the one or more deviations identified. The one or more causes are identified by performing at least one of the steps explained in the one or more blocks below.

At block 501, the lighting control system 101 validates the sensor data with the weather related data. In an embodiment, if cloudiness and visibility levels are in range, but the sensor value does not vary accordingly, then it is sensor error. Also, if the sensor is not varying in accordance with the sunrise/sunset, then also it is sensor error. Similarly, if the cloudiness and visibility levels are in range and the sensor value is also varying along with cloudiness, visibility and sunrise/sunset data, and still a deviation is encountered, then a correction in set-points is required.

At block 503, the lighting control system 101 identifies at least one of benchmark sites, benchmark circuits and benchmark sub-circuits based on at least one of location information, weather data, operating patterns, policy, configuration, asset types etc.

At block 505, the lighting control system 101 correlates the one or more deviation identified in the operation of exterior lights with the override data, weather data, policy, asset types, run-hours data and consumption data etc. In an embodiment, if the deviation is due to override, then it is not considered as a deviation. The weather related data, for example, if the cloudiness level are high and visibility is low and the current mode of operation shifts to schedule, then it is not considered as a deviation. Similarly, if the cloudiness levels are high and visibility is low and the operating mode of exterior lights does not shift on need, then it is considered as a deviation.

At block 507, the lighting control system 101 compares at least one of data and one or more deviation of the site of plurality of distributed sites 103 with the benchmark sites of the identified location. In an embodiment the one or more deviations are compared with the data of one or more circuits of the site or one or more circuits of the plurality of distributed sites of the identified location. In an embodiment, the comparison is done based on the policy adherence.

At block 509, the lighting control system 101 compares the one or more deviation data 213 with one or more data of the identified benchmark sites, benchmark circuits and benchmark sub-circuits. For example, if one of the circuits of the site operates optimally, then the operating mode of the circuit can be known to identify the causes of deviation in other circuits.

Figure 6:
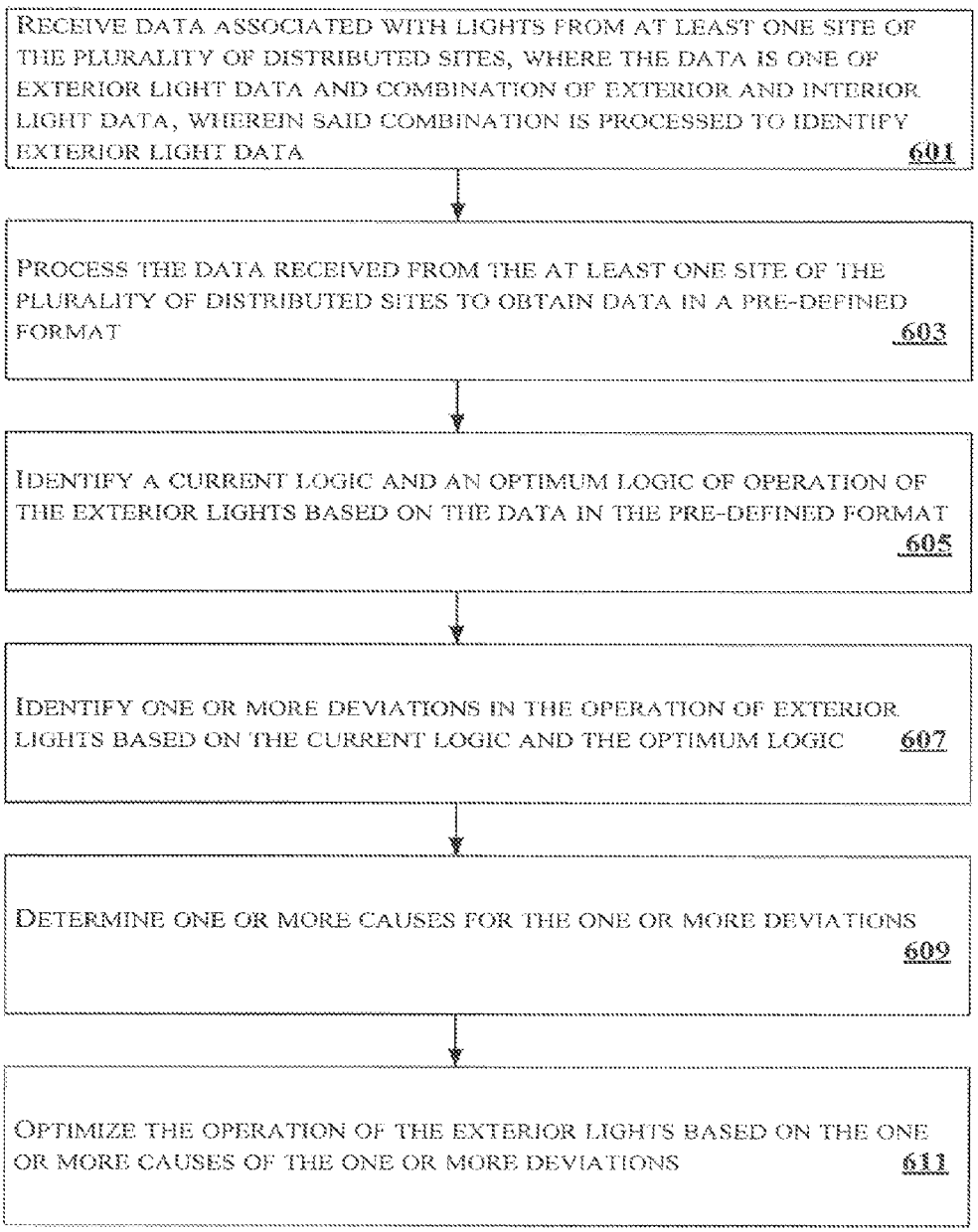
FIG. 6 illustrates a flowchart showing a method for optimizing the operations of exterior lights for a site of a plurality of distributed sites in accordance with some embodiments of present disclosure.

FIG. 6 illustrates a flowchart showing a method for optimizing the operations of exterior lights for a site of a plurality of distributed sites in accordance with some embodiments of present disclosure.

As illustrated in FIG. 6, the method 600 comprises one or more blocks for optimizing the operations of exterior lights for a plurality of distributed site. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

The exterior lights of a plurality of distributed sites 103 refer to any lights present outside the covered area. The exterior lights for the plurality of distributed sites 103 operate on various logics which lead to problems when operated in different service window. The lighting control system 101 optimizes the operation of the exterior lights for the plurality of distributed sites 103 by correlating multiple factors.

At block 601, the lighting control system 101 receives data associated with lights from at least one site of the plurality of distributed sites 103. The data received is one of exterior light data and combination of exterior and interior light data, where the said combination is processed to identify the exterior light data. In case, combination of exterior and interior light data is received, the exterior data is filtered from the combination of internal and external light data at the data.

At block 603, the lighting control system 101 processes the data received from the at least one site of the plurality of distributed sites 103 to obtain data in a pre-defined format.

At block 605, the lighting control system 101 identifies a current logic and an optimum logic of operation of the exterior lights based on the data in the pre-defined format.

At block 607, the lighting control system 101 identifies one or more deviations in the operation of exterior lights based on the current logic and the optimum logic.

At block 609, determine one or more causes for the one or more deviations. The one or more causes are determined by comparing at least one of the data and the one or more deviations of a plurality of sites of an identified location and by correlating the one or more deviations with override data and validating weather related data with sensors data.

At block 611, the lighting control system optimizes the operations of the exterior lights based on the one or more causes of the one or more deviations.

Computing System

Figure 7:
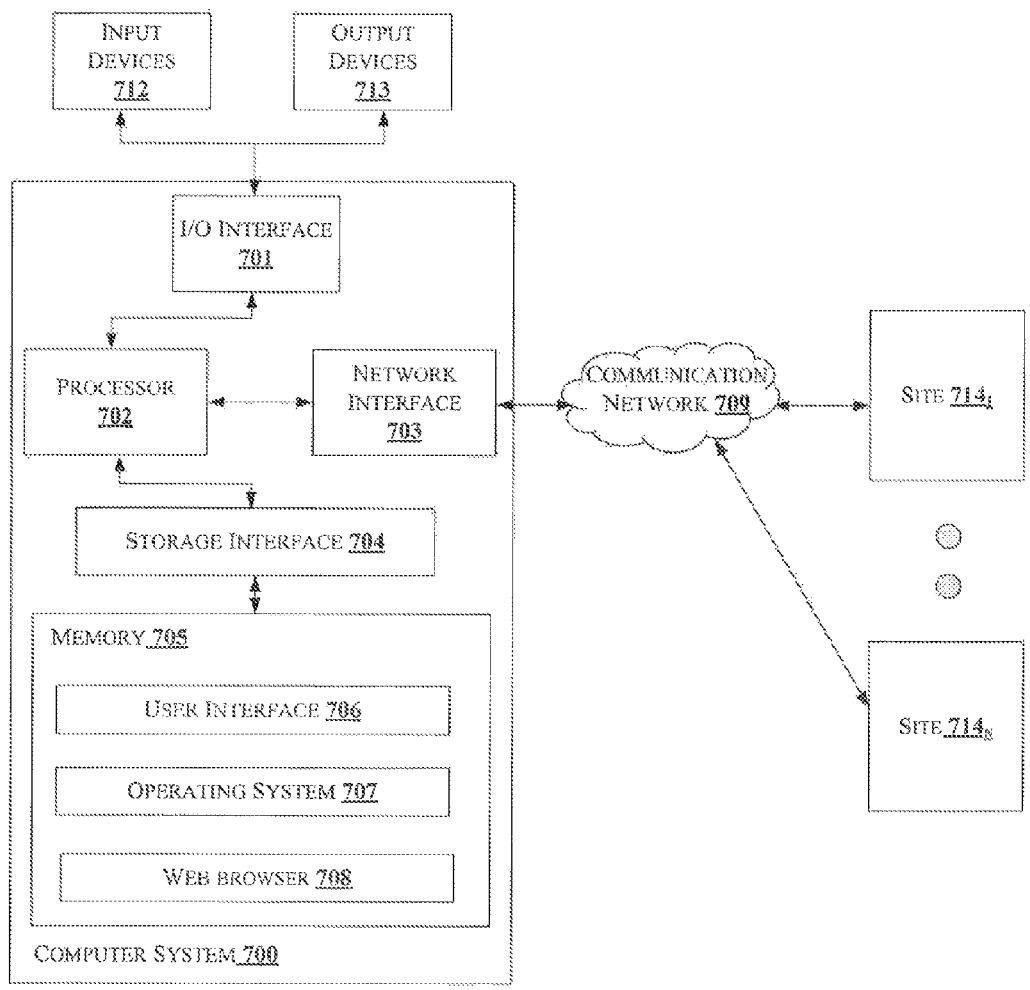
FIG. 7 illustrates a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the lighting control system. The computer system 700 may comprise a central processing unit ("CPU" or "processor") 702. The processor 702 may comprise at least one data processor for optimizing the operations of the exterior lights of a site of plurality of distributed sites. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 consists of a lighting control system. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with a plurality of distributed sites $714_1$, site $714_2$ ... site $714_N$. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in figure) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web browser 708 etc. In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure optimizes the operation of the exterior lights for a site at large scale without visiting the site and thus reduces the dependency on the expertise and skilled resources.

An embodiment of the present disclosure monitors the one or more deviations in the operation of the exterior lights and takes corrective actions based on priority.

An embodiment of the present disclosure provides unique methodology for correlating multiple factors by taking into account the site discrepancies.

An embodiment of the present disclosure provides permanent as well as temporary fixes for the one or more deviations by detecting the causes.

An embodiment of the present disclosure provides immediate corrections on temporary basis for mitigating non-compliance/statutory issues and opportunity loss.

An embodiment of the present disclosure monitors the resolutions taken and tracks the effectiveness of the one or more resolutions for optimizing the operation of exterior lights.

An embodiment of the present disclosure keeps a count of the recent alarm generated for a specific period of time, quantifies them and manages alarm trigger to avoid repeat or duplicate alarm within specific time interval.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Lighting control system |
| 103 | Plurality of distributed Sites |
| 105 | Communication network |
| 107 | I/O interface |
| 109 | Memory |
| 111 | Processor |
| 113 | One or more user devices |
| 115 | External sources |
| 117 | User data sources |
| 200 | Data |
| 201 | Configuration data |
| 203 | Static data |
| 205 | User device data |
| 207 | External source data |
| 211 | Current and optimum logic data |
| 213 | Deviation data |
| 215 | Benchmark data |
| 217 | Deviation cause data |
| 219 | Deviation impact data |
| 221 | Site priority data |
| 223 | Reports and alarm data |
| 225 | Exterior light optimizing data |
| 227 | Other data |
| 229 | Modules |
| 231 | Receiving module |
| 233 | Data processing module |
| 235 | Current and optimum logic identification module |
| 237 | Deviation identification module |
| 239 | Deviation cause identification module |
| 241 | Deviation impact calculation module |
| 243 | Site priority determination module |
| 245 | Reports and alarm generation module |
| 247 | Exterior light operation optimizing module |
| 249 | Monitoring module |
| 251 | Other modules |

What is claimed is:

1. A method for optimizing operation of exterior lights for a site of a plurality of distributed sites, the method comprising:
   receiving, by a lighting control system, data associated with lights from at least one site of the plurality of distributed sites, wherein the data is one of exterior lights data and combination of exterior and interior light data, said combination of external and internal light data is processed to identify the exterior light data;
   processing, by the lighting control system, the data received from the at least one site of the plurality of distributed sites to obtain data in a predefined format;
   identifying, by the lighting control system, a current logic and an optimum logic of operation of the exterior lights based on the data in the predefined format;
   identifying, by the lighting control system, one or more deviations in the operation of exterior lights based on the current logic and the optimum logic;
   determining, by the lighting control system, one or more causes for the one or more deviations; and
   optimizing, by the lighting control system, operation of the exterior lights based on the one or more causes of the one or more deviations.

2. The method as claimed in claim 1, wherein the data comprises exterior light status data, weather related data, sensors data and power consumption data, said data is received from at least one of one or more external sources and one or more user devices.

3. The method as claimed in claim 1, wherein processing the data comprises:
   validating, by the lighting control system, the data to identify invalid data, wherein the invalid data comprises treatable and non-treatable data;
   treating, by the lighting control system, the treatable data;
   filtering, by the lighting control system, the invalid data by retaining treated data and removing the non-treatable invalid data;
   determining, by the lighting control system, sufficiency of the filtered data;
   calculating, by the lighting control system, one or more transition points for the lighting status data, schedule data, occupancy data and sensor data using the filtered data; and
   combining, by the lighting control system, the one or more transition points of the lighting status data, the schedule data, the occupancy data and the sensor data to obtain the data in the predefined format.

4. The method as claimed in claim 1, wherein the current logic for operating the exterior lights comprises one of sensor mode, schedule mode and occupancy mode.

5. The method as claimed in claim 1, wherein optimum logic for operating the exterior lights is identified based on efficiency of operation of the exterior lights of plurality of distributed sites and statutory policy compliances.

6. The method as claimed in claim 5 further comprising optimizing operation of the exterior lights comprises conforming to the statutory policy requirements.

7. The method as claimed in claim 1 further comprising identifying one or more impacts for the one or more deviations.

8. The method as claimed in claim 7 further comprising determining a priority for at least one site based on at least one of one or more causes of the one or more deviations and the one or more impacts for the one or more deviations.

9. The method as claimed in claim 8, further comprising generating one or more reports and alarms based on the priority and expertise required for one or more resolutions to optimize operations of the exterior lights.

10. The method as claimed in claim 1, wherein determining the one or more causes comprises at least one of:
   validating, by the lighting control system, the sensor data with weather related data;
   identifying, by the lighting control system, at least one of benchmark sites, benchmark circuits and benchmark sub-circuits based on at least one of location information, weather data, operating patterns, asset types and policy;
   correlating, by the lighting control system, the one or more deviations with override data, the weather data, the policy, the asset types, run-hours data and consumption data;
   comparing, by the lighting control system, at least one of the data and the one or more deviations of the site of the plurality of distributed sites with the benchmark sites in an identified location;
   comparing, by the lighting control system, the one or more deviation data with one or more data of the identified benchmark sites, benchmark circuits and benchmark sub-circuits.

11. The method as claimed in claim 1, wherein optimizing the operation of exterior lights comprises continually monitoring at least one of the one or more deviations, the one or more causes, one or more impacts, and one or more resolutions performed and determining an effectiveness of the one or more resolutions, wherein the effectiveness is determined for at least one of one or more modes of optimization and one or more entities optimizing the operation of exterior lights.

12. A lighting control system for optimizing operation of exterior lights for a site of a plurality of distributed sites, comprising:
   a processor; and
   a memory communicatively coupled to the processor, wherein the memory stores processor instructions, which, on execution, causes the processor to:
      receive data associated with lights from at least one site of the plurality of distributed sites, wherein the data is one of exterior lights data and combination of exterior and interior light data, said combination of external and internal light data is processed to identify the exterior light data;
      process the data received from the at least one site of the plurality of distributed sites to obtain data in a predefined format;
      identify current logic and an optimum logic of operation of the exterior lights based on the data in the predefined format;
      identify one or more deviations in the operation of exterior lights based on the current logic and the optimum logic;
      determine one or more causes for the one or more deviations; and
      optimize operation of the exterior lights based on the one or more causes of the one or more deviations.

13. The lighting control system as claimed in claim 12, wherein processing the data by the processor comprises:
   validating the data to identify invalid data;
   treating the treatable data;
   filtering the invalid data by retaining the treated data and removing the non-treatable invalid data;
   determining sufficiency of the filtered data;
   calculating one or more transition points for the lighting status data, schedule data, occupancy data and sensor data using the filtered data; and
   combining the one or more transition points of the lighting status data, the schedule data, the occupancy data and the sensor data to obtain the data in the predefined format.

14. The lighting control system as claimed in claim 12, wherein the processor identifies optimum logic for operating the exterior lights based on efficiency of operation of the exterior lights of plurality of distributed sites and statutory policy compliances.

15. The lighting control system as claimed in claim 14, wherein the processor is further configured to optimize operation of the exterior lights comprises conforming to the statutory policy requirements.

16. The lighting control system as claimed in claim 12, wherein the processor is further configured to identify one or more impacts for the one or more deviations.

17. The lighting control system as claimed in claim 16, wherein the processor is further configured to determine a priority for at least one site based on at least one of one or more causes of the one or more deviations and the one or more impacts for the one or more deviations.

18. The lighting control system as claimed in claim 17, wherein the processor is further configured to generate one or more reports and alarms based on the priority and expertise required for one or more resolutions to optimize operations of the exterior lights.

19. The lighting control system as claimed in claim 12, wherein the processor determines the one or more causes by performing at least one of:
- validating the sensor data with weather related data;
- identifying at least one of benchmark sites, benchmark circuits and benchmark sub-circuits based on at least one of location information, weather data, operating patterns, asset types and policy;
- correlating the one or more deviations with override data, the weather data, the policy, the asset types, run-hours data and consumption data;
- comparing at least one of the data and the one or more deviations of the site of the plurality of distributed sites with the benchmark sites in an identified location; and
- comparing the one or more deviation data with one or more data of the identified benchmark sites, benchmark circuits and benchmark sub-circuits.

20. The lighting control system as claimed in claim 12, wherein optimizing the operation of exterior lights comprises continually monitoring at least one of the one or more deviations, the one or more causes, one or more impacts, and one or more resolutions performed and determining an effectiveness of the one or more resolutions, wherein the effectiveness is determined for at least one of one or more modes of optimization and one or more entities optimizing the operation of exterior lights.

21. A non-transitory computer readable medium including instruction stored thereon that when processed by at least one processor cause a lighting control system to perform operation comprising:
- receiving data associated with lights from at least one site of the plurality of distributed sites, wherein the data is one of exterior lights data and combination of exterior and interior light data, said combination of external and internal light data is processed to identify the exterior light data;
- processing the data received from the at least one site of the plurality of distributed sites to obtain data in a predefined format;
- identifying a current logic and an optimum logic of operation of the exterior lights based on the data in the predefined format;
- identifying one or more deviations in the operation of exterior lights based on the current logic and the optimum logic;
- determining one or more causes for the one or more deviations; and
- optimizing operation of the exterior lights based on the one or more causes of the one or more deviations.

22. The medium as claimed in claim 21, wherein the instruction causes the processor to:
- validating the data to identify invalid data;
- treating the treatable data;
- filtering the invalid data by retaining treated data and removing the non-treatable invalid data;
- determining sufficiency of the filtered data;
- calculating one or more transition points for the lighting status data, schedule data, occupancy data and sensor data using the filtered data; and
- combining the one or more transition points of the lighting status data, the schedule data, the occupancy data and the sensor data to obtain the data in the predefined format.

23. The medium as claimed in claim 21, wherein the instructions causes the processor to identify optimum logic for operating the exterior lights based on efficiency of operation of the exterior lights of plurality of distributed sites and statutory policy compliances.

24. The medium as claimed in claim 23, wherein the instructions causes the processor to optimize operation of the exterior lights comprises conforming to the statutory policy requirements.

25. The medium as claimed in claim 21, wherein the instruction causes the processor to identify one or more impacts for the one or more deviations.

26. The medium as claimed in claim 25, wherein the instructions causes the processor to determine a priority for at least one site based on at least one of the one or more causes of the one or more deviations and the one or more impacts for the one or more deviations.

27. The medium as claimed in claim 26, wherein the instructions causes the processor to generate one or more reports and alarms based on the priority and expertise required for one or more resolutions to optimize operations of the exterior lights.

28. The medium as claimed in claim 21, wherein the instruction causes the processor to determine the one or more causes by performing at least one of:
- validating the sensor data with weather related data;
- identifying at least one of benchmark sites, benchmark circuits and benchmark sub-circuits based on at least one of location information, weather data, operating patterns, asset types and policy;
- correlating the one or more deviations with override data, the weather data, the policy, the asset types, run-hours data and consumption data;
- comparing at least one of the data and the one or more deviations of the site of the plurality of distributed sites with the benchmark sites in an identified location;
- comparing the one or more deviation data with one or more data of the identified benchmark sites, benchmark circuits and benchmark sub-circuits.

* * * * *

UNITED STATES PATENT AND TRADEMARK OFFICE
CERTIFICATE OF CORRECTION

PATENT NO. : 9,655,208 B1
APPLICATION NO. : 15/070783
DATED : May 16, 2017
INVENTOR(S) : Prabhu Raja Subbarayalu Venkitapathi et al.

It is certified that error appears in the above-identified patent and that said Letters Patent is hereby corrected as shown below:

In the Claims

Claim 12, Column 22, Line 11, "causes" should read as --cause--.

Claim 21, Column 23, Line 27, "instruction" should read as --instructions--.

Claim 21, Column 23, Line 28-29, "perform operation" should read as --perform operations--.

Claim 22, Column 23, Lines 48-49, "instruction causes" should read as --instructions cause--.

Claim 22, Column 23, Line 50, "validating" should read as --validate--.

Claim 22, Column 23, Line 51, "treating" should read as --treat--.

Claim 22, Column 24, Line 1, "filtering" should read as --filter--.

Claim 22, Column 24, Line 3, "determining" should read as --determine--.

Claim 22, Column 24, Line 4, "calculating" should read as --calculate--.

Claim 22, Column 24, Line 7, "combining" should read as --combine--.

Claim 23, Column 24, Line 12, "causes" should read as --cause--.

Claim 24, Column 24, Line 17, "causes" should read as --cause--.

Claim 25, Column 24, Line 21, "instruction causes" should read as --instructions cause--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,655,208 B1

Claim 26, Column 24, Line 24, "causes" should read as --cause--.

Claim 27, Column 24, Line 29, "causes" should read as --cause--.

Claim 28, Column 24, Line 34, "instruction causes" should read as --instructions cause--.